Dec. 2, 1969  W. S. WISNIEWSKI  3,482,030
UNDERGROUND ELECTRICAL CONDUCTOR HOUSING
WITH INNER BELL-JAR HOUSING
Filed Sept. 30, 1968  2 Sheets-Sheet 1

INVENTOR
WALTER S. WISNIEWSKI
BY
B.T. Wolbensmith
ATTORNEY

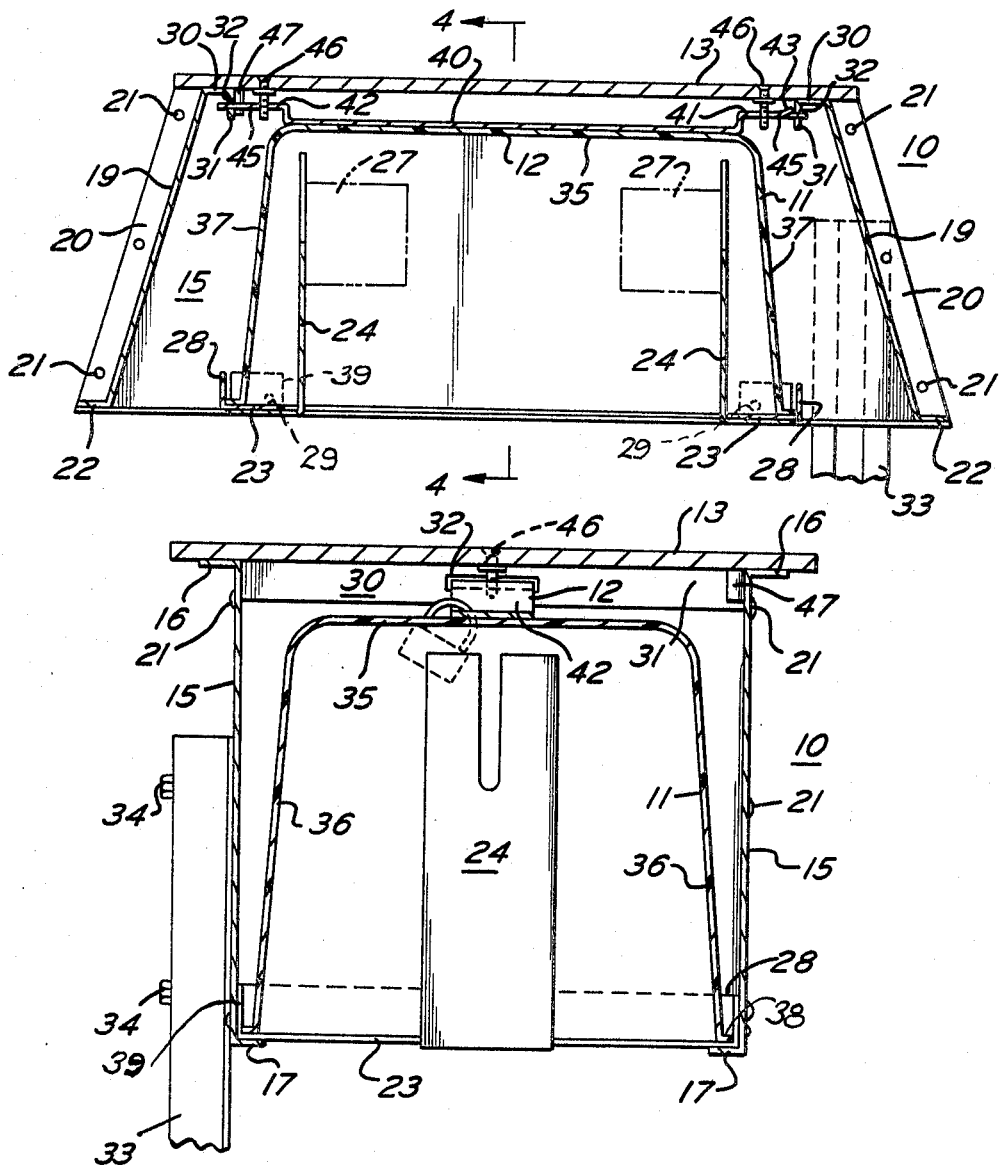

United States Patent Office

3,482,030
Patented Dec. 2, 1969

3,482,030
UNDERGROUND ELECTRICAL CONDUCTOR HOUSING WITH INNER BELL-JAR HOUSING
Walter S. Wisniewski, Cheltenham, Pa., assignor to Pepco Products Corporation, Philadelphia, Pa., a corporation of Pennsylvania
Filed Sept. 30, 1968, Ser. No. 763,539
Int. Cl. H02g 9/02
U.S. Cl. 174—37                                    9 Claims

ABSTRACT OF THE DISCLOSURE

A flush mounted receptacle is shown for use in the earth, suitable for electrical, and television cable connections, which includes an outer housing which is buried in the earth and has a removable top plate for access to the interior. Within the outer housing an inner inverted housing is provided which functions as a bell to prevent rise of water therein and within which the ends of the cables to be connected extend. The inner housing is retained in place and unauthorized access thereto is prevented by a locking bar.

BACKGROUND OF THE INVENTION

Field of the invention

This invention relates to flush mounted receptacle for electrical connections and particularly for use in the ground having an inner inverted housing for the electrical connections and an outer exposed protective housing, unauthorized access to the inner housing being prevented by a locking bar.

Description of the prior art

Various types of connection boxes exposed in the out of doors have been proposed for electrical connections which are disposed underground but no satisfactory receptacle which is flush with or a short distance below the surface of the ground has heretofore been available.

SUMMARY OF THE INVENTION

In accordance with the invention an underground cable connection receptacle is provided which includes an outer housing with a top closure plate which may be flush with the surface of the earth, and an inner inverted housing into which the ends of the cables to be connected extend, the inner receptacle being held in place and unauthorized access to the cable ends being prevented by a locking bar carried by the outer housing.

It is the principal object of the present invention to provide a flush mounted receptacle for connection of the ends of cables, such as CATV cables, and electrical cables which is simple in construction, is easy to install, provides authorized access to the cable ends but prevents unauthorized access, and which provides adequate protection against entrance of water into the interior.

It is a further object of the present invention to provide a flush mounted receptacle of the character aforesaid which will have a long life.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 3 is a vertical sectional view taken approximately on the line 3—3 of FIG. 2; and FIG. 4 is a vertical sectional view taken approximately on the line 4—4 of FIG. 3.

Figure 1:
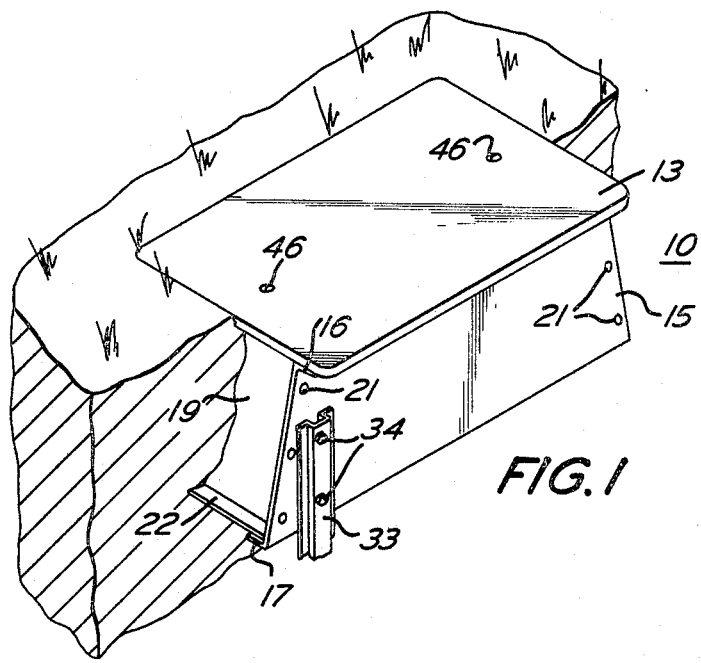
FIGURE 1 is a view in perspective of the receptacle in accordance with the invention, parts being broken away to show the details of construction.
Figure 2:
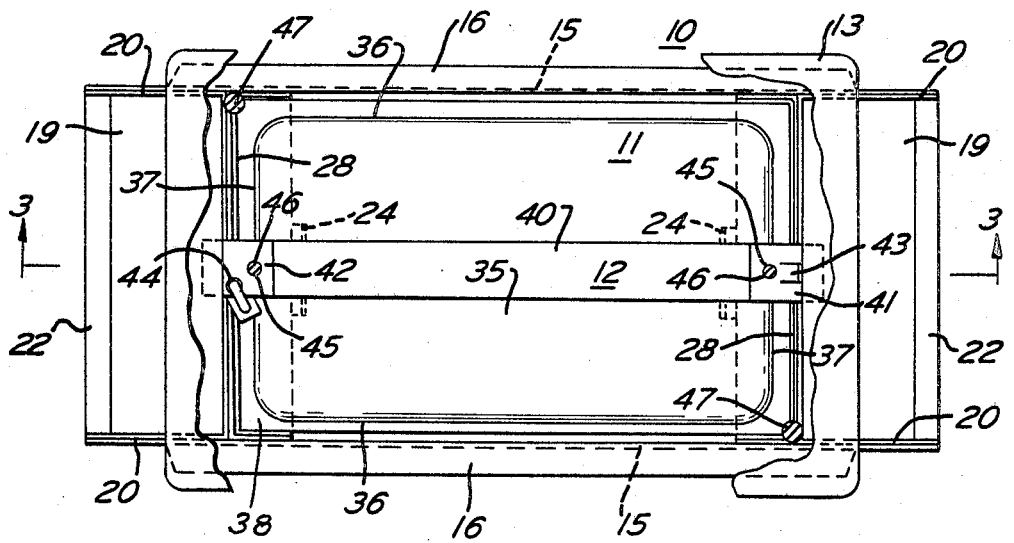
FIG. 2 is a top plan view of the receptacle shown in FIG. 1, parts being broken away to show the details of construction.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, in the preferred embodiment illustrated, an outer housing 10, inner housing 11, locking bar 12 and removable top cover plate 13 are provided.

The outer housing 10 is preferably rectangular in horizontal cross section and includes opposite vertical side walls 15 of generally trapezoidal shape with out-turned upper rims 16 and inturned lower rims 17.

The housing 10 has opposite inclined end walls 19 with out turned side marginal rims 20 secured to the ends of the side walls 15, in any desired manner, such as by rivets 21, and bottom marginal rims 22.

Transverse brackets 23 can be provided extending between the side walls 15 and inwardly of the end walls 19, and have upturned portions 24 which provide brackets for carrying connection boxes 27 or the like to which cables to be connected extend.

The brackets 23 have transverse stop bars 28 for endwise positioning of the inner housing 11 as hereinafter explained.

The end walls 19 have locking bar receiving brackets 30 carired thereby with vertically downwardly extending portions 31 having slots 32 for slidable movement therein of the locking bar 12.

If desired, and if hold down requirements necessitate, anchor posts 33 may be provided, secured to the side walls 15 such as by bolts 34.

The outer housing 10 is preferably of metal, and of a composition resistant to corrosion at the location of use, or with suitable surface coatings to prevent corrosion.

The inner housing 11 is preferably of inverted pan or bell configuration with a horizontal wall 35 and integral flared side and end walls 36 and 37. The housing 11 for a particular embodiment has minimum internal dimensions of nine inches by sixteen inches with a depth of eight inches. The housing 11 can be of a single piece of material, molded or drawn, and while it may be of metal, it is preferably of synthetic plastic material which is non-porous, light in weight, resistant to corrosion and if of synthetic plastic is capable of withstanding temperature changes in the range from —40° F. to 180° F.

The locking bar 12 is preferably of metal strip with an elongated central portion 40 for engagement with the exterior of the wall 35 and ends 41 and 42 offset from the plane of the central portion 40 and for slidable movement in the slots 32. The end 41 preferably has a stop or limit finger 43 extending therefrom to limit the movement of the end in its slot 32.

The end 42 has an opening 44 for the reception of a locking element which may be a small padlock or a wire with a lead seal on its ends.

The ends 41 and 42 have internally threaded holes 45 for engagement of holddown bolts 46 carried by the cover plate 13.

The cover plate 13 is relatively rigid, and in a particular embodiment in which it has a length of twenty one inches and a width of thirteen inches, is a plate of 10 gauge or five-sixteenths of an inch thickness. The cover plate 13 is preferably provided with locating pins 47 extending from the lower face and the upper face can be finished as desired, with an anti-friction finish, or with identifying indicia.

The mode of use will now be pointed out.

With the ends of cables in contiguous relation, the outer housing 10 is positioned in the earth with the cable ends therein and with the margins of the walls 15 and 19 at the desired location with respect to the surface of the earth dependent on whether the receptacle is to be buried, or whether flush mounting is desired.

The ends of cables are connected between the brackets 24 in any desired manner and the inner housing 11 is applied thereover. The inner housing 11 is positioned by the transverse stop bars 28.

The end 42 of the locking bar 12 is first inserted in its slot 32, and with the central portion 40 thereof engaged on the wall 35 the end 41 is slid in its slot 32 until the stop finger 43 prevents further movement. The opening 44 is then in a position for insertion and securing of the lock which prevents unauthorized removal of the locking bar 12.

The cover plate 13, positioned by the locating pins 47 is then secured in place by tightening the holddown bolts 46 in engagement in the holes 45.

Water is prevented from reaching the cable ends or their connectors by the bell action of the inner receptacle 11, air trapped providing a back pressure to keep the water from rising.

Authorized access to the ends of cables can be obtained by removal of the cover plate 13, the locking bars 12 and the inner housing 11. Unauthorized access is discouraged by the retention of the locking bar 12.

If flooding takes place within the outer housing 10 the inner housing 11 prevents access of water to the interior thereof because of air trapped therein, and upon removal of the cover plate 13 the water can be pumped out before the inner housing is removed for access to the cable ends.

The structure heretofore described is particularly suited for the connections of subscriber's cables to the delivery cables of CATV, but is not limited to such.

I claim:
1. A receptacle for electrical conductors comprising:
an outer housing having side and end walls and lower connecting members between said side walls, intermediate their ends,
an inner inverted fluid tight housing having an interior space for the reception of conductor ends and an open bottom portion through which said conductors extend disposed at the lower ends of said side walls and engaging said connecting members, and
a locking bar engageable with portions of said outer housing and engaging said inner housing and retaining the latter in place, and
a removable closure for the upper part of said outer housing.
2. A receptacle as defined in claim 1, in which:
said outer housing has a pair of walls downwardly and outwardly inclined for retaining said housing in place.
3. A receptacle as defined in claim 1, in which:
said outer housing has upper rims for engagement by said closure.
4. A receptacle as defined in claim 1, in which:
said outer housing has lower inwardly extending rims for supporting engagement with said inner receptacle.
5. A receptacle as defined in claim 1, in which:
said closure is a plate, and
said closure has detachable fastening members engaged therewith and with said locking bar.
6. A receptacle as defined in claim 1, in which:
said outer receptacle has brackets provided with slots, and
said locking bar has end portions slidable in said slots.
7. A receptacle as defined in claim 6, in which:
said locking bar has a stop on one of said end portions for limiting the movement thereof in one direction, and
said locking bar at the other of said end portions has a part for engagement by a locking member.
8. A receptacle as defined in claim 1, in which:
said inner receptacle has a horizontal wall portion with which said locking bar is in engagement.
9. A receptacle as defined in claim 1, in which:
said inner receptacle is of unitary construction and is of synthetic plastic material.

References Cited
UNITED STATES PATENTS 3,364,299  1/1968  Hamilton _____ 174—37

FOREIGN PATENTS 736,813  9/1955  Great Britain.

OTHER REFERENCES

Electrical World, Burndy Co. Advertisement, Vol. 166, No. 8, Aug. 22, 1966, page 88.

LARAMIE E. ASKIN, Primary Examiner

U.S. Cl. X.R.

137—371

PO-1050
(5/69)

UNITED STATES PATENT OFFICE
CERTIFICATE OF CORRECTION

Patent No. 3,482,030        Dated December 2, 1969

Inventor(s) WALTER S. WISNIEWSKI

It is certified that error appears in the above-identified patent and that said Letters Patent are hereby corrected as shown below:

The name of the Assignee should read:

Repco Products Corporation

Column 2,

Line 40, after "30" the word "carired"

should be - carried - .

SIGNED AND
SEALED
MAY 26 1970

(SEAL)
Attest:

Edward M. Fletcher, Jr.
Attesting Officer

WILLIAM E. SCHUYLER, JR.
Commissioner of Patents